T. H. MONK.
STUMP PULLER.
APPLICATION FILED JUNE 7, 1918.

1,298,372.

Patented Mar. 25, 1919.

WITNESSES

INVENTOR
Thomas H. Monk

BY Richard B. Owen.

ATTORNEY

UNITED STATES PATENT OFFICE.

THOMAS H. MONK, OF THOMASVILLE, GEORGIA.

STUMP-PULLER.

1,298,372.	Specification of Letters Patent.	Patented Mar. 25, 1919.

Application filed June 7, 1918. Serial No. 238,776.

*To all whom it may concern:*

Be it known that I, THOMAS H. MONK, a citizen of the United States, residing at Thomasville, in the county of Thomas and State of Georgia, have invented certain new and useful Improvements in Stump-Pullers, of which the following is a specification.

This invention relates to traversing hoists, and more especially to linear machines traveling on the surface and including a drum; and the object of the same is to produce an improved stump puller by means of which the power or draft by a tractor or team is converted into upward pull so that the stump is lifted out of the ground and carried forward at a single operation. A further object is to provide means whereby the machine can be drawn forward or moved from place to place without necessarily turning its drum or drums.

Other objects are brought out in the following specification and claims, and I refer to the accompanying drawings, in which:—

Figure 1:
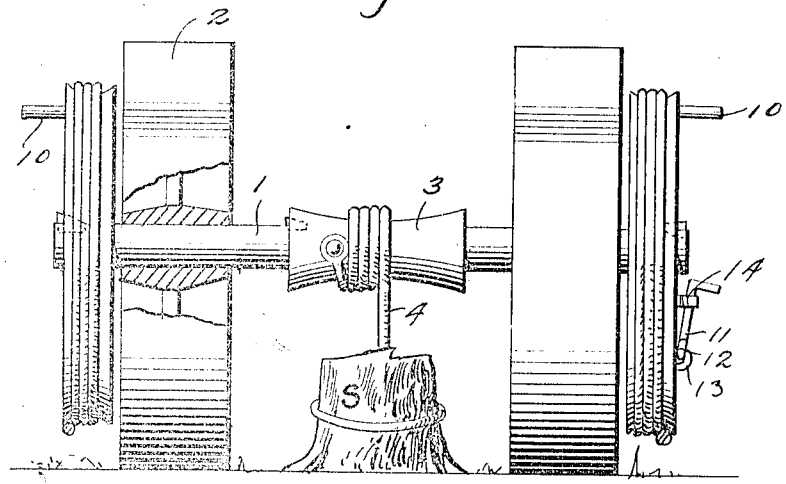
Figure 1 is a front elevation of this machine at work.

In the drawings the numeral 1 designates a stout axle on which are loosely mounted wide-tread supporting wheels 2, and between them there is keyed to the axle a wide pulley 3 around which is wound the rope or chain 4 which is to be looped around and attached to the stump S as shown. Alongside the supporting wheels, and preferably on the outside thereof, are keyed relatively large winding drums 5, each preferably having a dished periphery around which is wound a hauling rope 6, and the two ropes are led forward and attached to a cross bar or whiffletree 7 to which in turn is attached the draft at 8, whether said draft be machine power or horse power. Ropes or chains or steel cables can be used at 4 and 6, but I will refer to the former as a chain and the latter as a rope for the purpose of distinguishing the same. The essential feature is that the hauling ropes should be wound around the drums reversely to the direction in which the machine is to move when draft is applied, and that the lifting chain should be wound around the pulley 3 in the opposite direction. This puts the draft near the ground which is useful, not only because in case the main wheels are rather large, it is desirable to have the whiffletree low, but also in order that the draft will not impart so strong a tendency to the machine to move forward.

Figure 2:
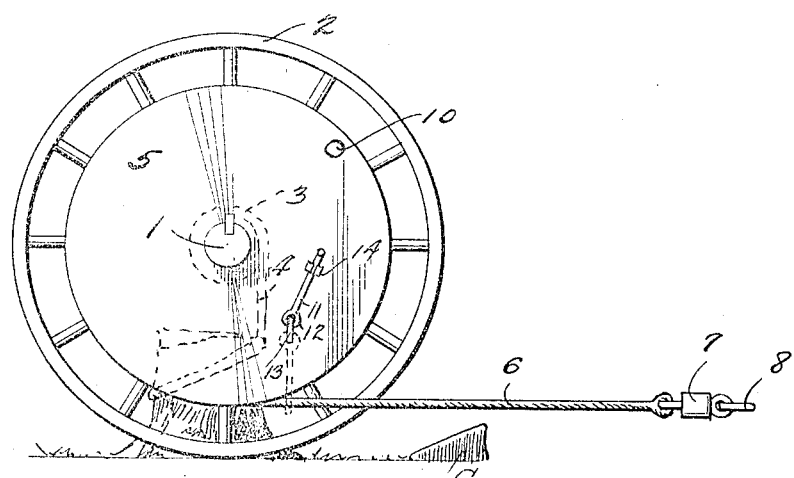
Fig. 2 is a side view thereof.

The details of construction are hardly essential. I might add that hand-holds 10 in the shape of handles or plugs might be attached to or driven into the outer sides of the drums 5, so that they and the axle and pulley 3 could be turned manually at any time, without affecting the position of the machine while the main wheels 2 stand at rest. Also, in order that the machine may be drawn from point to point without unreeling the ropes 6 from the drums 5, it is desirable that a latch be attached to each drum and at this time hooked over the rope. I have shown this latch at 11 in Fig. 3 as a hook having an eye 12 engaging a staple 13 in the outside of the drum 5, and a catch 14 for holding the latch out of use as seen in full lines in Fig. 2. When in use it is disengaged from the catch and swung down as shown in dotted lines in Fig. 2. However, I do not wish to be limited to this form of latch. I have shown the drums on the outside of the main wheels, but this is only the preferred arrangement. When so disposed there is easier access to the hand-holds and the latch, and a wider space is left between the main wheels so that the machine can be moved astride a larger stump. The proportions and materials of parts are not essential.

In use, with the hauling ropes 6 hooked or latched to the drums, the device is dragged to the point of use and astride a stump S. The latches are now thrown up to the position shown in Fig. 3. If desired the supporting wheels may be chocked, though I prefer that they shall roll. The lifting rope or chain 4 is now unreeled from the pulley 2, and a noose passed around the stump S. Then the axle and parts carried thereby are rotated until the chain is taut and the hauling ropes drawn forward by the whiffletree or cross bar 7 until they also are taut. Now the draft is attached at 8 and all is ready, and when the draft is applied it is obvious that the tendency of the hauling ropes is to reversely rotate the drums, because these ropes pass under and around the drums rather than over them. If the wheels are chocked, there is a simple element of leverage produced by the different lengths of the radii of the drums 5 and the pulley 3. But without any chock blocks as indicated at C, the draft imparts a tendency to the structure to move forward on its supporting wheels 2, which tendency is resisted by the pull of the chain 4 on the stump. Meanwhile the upward pull on said chain is the same as above described, and therefore the stump is lifted by a progressing forward draft instead of by a direct pull upward as would occur if the machine stood still. In either case it will be found that, with proper proportion existing between the size of the drums and that of the pulley, the stump will be quickly drawn out of the ground, after which it may be dragged to any convenient point and left. During the dragging action the latches 11 will be thrown into action as suggested above, although their principal use is at times when the machine is being transported from point to point without a load attached.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a stump puller, the combination with a main axle, and ground wheels loosely mounted thereon; of a relatively small pulley fast on said axle, a lifting chain attached thereto, a relatively large drum also fast on said axle, and a hauling rope attached to the drum.

2. In a stump puller, the combination with a main axle, and ground wheels loosely mounted thereon; of a relatively small pulley fast on said axle between the wheels, a lifting chain attached thereto, a pair of relatively large drums fast on the axle at opposite sides of the pulley and adjacent said wheels, and hauling ropes attached to said drums.

3. In a stump puller, the combination with a main axle, and ground wheels loosely mounted thereon; of a relatively small pulley fast on said axle between the wheels, a lifting chain attached thereto, a pair of relatively large drums fast on the axle at the outer sides of the wheels than which they are of smaller circumference, and hauling ropes attached to said drums.

4. In a stump puller, the combination with an axle, spaced supporting wheels loosely mounted thereon, a relatively small pulley keyed to the axle between said wheels, and a lifting chain attached to said pulley and wound thereon and led downward for attachment to the stump; of relatively large drums keyed to the ends of the axle outside said wheels than which they are of smaller circumference, hauling ropes attached to said drums and wound around the same and led forward from their under sides, and a whiffletree connecting said ropes and to which the draft is adapted to be attached.

5. In a stump puller of the type described, the combination with a pair of ground wheels loose on an axle, and lifting means including a pulley fast on the axle between the wheels and a chain wound on and hanging from the pulley; of relative large drums fastened to the axle at opposite sides of said lifting means, ropes secured to and wound around these drums and led forward, means connecting them and to which the draft is adapted to be attached, a latch carried by each drum and adapted to engage the rope to prevent its unwinding from the drum, and means for holding the latch out of such engagement.

6. In a stump puller of the type described, the combination with a pair of spaced supports, an axle journaled therein, and lifting means including a chain connected with the axle between the supports; of relatively large drums fastened to the axle at opposite sides of said lifting means, ropes secured to and wound around these drums and led forward, a whiffletree connecting them and to which the draft is adapted to be attached, a latch carried by each drum and adapted to engage the rope to prevent its unwinding from the drum, and means for holding the latch out of such engagement.

In testimony whereof I affix my signature in presence of two witnesses.

THOMAS H. MONK.

Witnesses:
W. A. SUTTON,
C. M. HEETH.